United States Patent [19]

Ohta et al.

[11] 4,281,557

[45] Aug. 4, 1981

[54] MEANS FOR DRIVING A MOVABLE BODY

[75] Inventors: Sakae Ohta; Tatsuo Tani, both of Tokyo, Japan

[73] Assignee: Kabushiki Kaisha Ricoh, Tokyo, Japan

[21] Appl. No.: 57,900

[22] Filed: Jul. 16, 1979

[51] Int. Cl.³ .................... F16H 27/02; F16H 7/12
[52] U.S. Cl. .................... 74/89.22; 474/109; 474/110; 474/135
[58] Field of Search .................... 74/37, 89.2, 89.22, 74/242.1 R, 242.1 A, 242.1 TA, 242.1 FP, 242.8, 242.9, 242.11 R, 242.11 A, 242.11 C, 242.11 E, 242.11 P; 474/109, 110, 135, 138

[56] References Cited

U.S. PATENT DOCUMENTS

| 2,766,417 | 10/1956 | Merritt | 74/242.8 |
| 3,817,113 | 6/1974 | Pfarrwaller | 74/242.1 R |
| 3,978,693 | 9/1976 | Worst | 474/138 X |
| 4,040,305 | 8/1977 | Cadic | 74/242.11 R |

FOREIGN PATENT DOCUMENTS

| 415000 | 6/1925 | Fed. Rep. of Germany | 74/242.1 R |
| 1575619 | 1/1970 | Fed. Rep. of Germany | 74/242.9 |
| 353594 | 5/1961 | Switzerland | 74/242.11 R |
| 928495 | 6/1963 | United Kingdom | 74/242.1 R |

Primary Examiner—Lawrence J. Staab
Attorney, Agent, or Firm—Oblon, Fisher, Spivak, McClelland & Maier

[57] ABSTRACT

A mechanism for driving a movable body including a movable body reciprocatingly movable along guide members, a member for driving said movable body reciprocatingly, a wire for connecting the movable body with the driving member, a tension member arranged in a slack portion of the wire during the time of advancing movement of the movable body and elastic means for providing a strong or a weak tension force to the tension member, the weak tension force being applied to the tension member during advancing movement of the movable body and the strong tension force being applied to the tension member during returning movement of the movable body.

7 Claims, 8 Drawing Figures (a)

(b)

MEANS FOR DRIVING A MOVABLE BODY

BACKGROUND OF THE INVENTION

1. Field of the Invention

The invention relates to a mechanism for driving a movable body used in a reproducing apparatus, more particularly to a mechanism for driving an optical system or an original platform which move reciprocatingly in a reproducing apparatus.

2. Description of the Prior Art

In a conventional reproducing apparatus, a movable body making a reciprocating movement is usually connected with a driving source by a conduction mechanism wound therearound.

In FIG. 1, there is shown a schematic drawing illustrating a conventional reproducing apparatus wherein an original is fixed and an optical system is movable. In the schematic drawing, reference number 1 denotes a fixed original platform on which an original (not shown) is laid. Under the original platform 1 are supported a first movable mirror 2 and a second movable mirror 3 upon a support (not shown) in such a way that they may be movable parallel to the original platform 1 and movably mounted to guide members.

First movable mirror 2 and second movable mirror 3 reciprocatingly move in the direction of the length of original platform 1 under the principle of a moving pulley which will be explained in detail later. On both sides of its moving region, there are provided a pair of fixed pulleys 4 and 5 respectively. Further, upon the support (not shown) for the second movable mirror 3, there is provided a double slotted moving pulley 6.

Between the fixed pulleys 4 and 5, there is provided a double slotted guide pulley 7 and under the guide pulley 7, there is provided a driving pulley 8. A wire 9 one end 9a of which is fixed to an immovable member 10 is entrained over a moving pulley 6 in the form of U-shaped figure and after being turned back thereat, the wire is entrained over a fixed pulley 4 on one side and is afterwards turned back again thereat, the wire is guided to a driving pulley 8 via a guide pulley 7. Wire 9 is wound upon the driving pulley 8 in a plurality of turns and after being entrained over guide pulley 7, is fixed to the first movable mirror 2 after being turned back in another fixed pulley 5, and is turned back in the form of U-shaped figure after being entrained again on the moving pulley 6.

The other end 9b of the wire 9 wound upon each pulley, as mentioned above and to which the first movable mirror 2 is fixed, is fixed to an immovable member 10.

When the driving pulley 8 being rotated by a driving source (not shown) in the advancing direction shown by an arrow a, the first movable mirror 2 connected with the driving pulley 8 via the wire 9 moves at the speed V in the returning direction shown by an arrow a1. At this time, as the moving pulley 6 mounted upon the second movable mirror 3 moves under the principle of a moving pulley, the second movable mirror 3 makes a follow movement at the speed ½V in the direction shown by an arrow a2.

Further, the first and second movable mirrors 2 and 3 shown in the FIG. 1 are in positions which are departed to some extent from their home or original positions.

The advancing rotation of the driving pulley 8 lasts until first movable mirror 2 has moved from the left end of the original platform 1 to the right end. At this time, the first movable mirror 2 scans an original image illuminated by a light source (not shown) in a slit form and its light image is reflected toward the second movable mirror 3. The light image reflected by the second movable mirror 3 is guided to an exposure station of a reproducing apparatus (not shown).

When the first movable mirror 2 and second movable mirror 3 move to the right end of the original platform 1, the driving pulley 8 begins to rotate in the direction of returning shown in the drawing by an arrow b. Then, the first and second movable mirrors 2 and 3 move in the returning direction shown by arrows b1 and b2 respectively and return to their original positions.

Wire 9 connecting the driving pulley 8 as a driving member and the first and second movable mirrors 2 and 3 as movable bodies is wound with some slack for enabling position adjustment of each movable mirror, for instance. Further, if the first and second movable mirrors 2 and 3 were not moved at a predetermined constant speed, the formation of a light image in an exposure station would be disturbed.

Therefore, the above mentioned wire 9 is provided with a tension mechanism for absorbing the above mentioned slack. This tension mechanism is usually provided in the slack portion of the wire. In the apparatus shown in FIG. 1, a tension pulley 11 is also provided on the wire portion 9c between a guide pulley 7 and the driving pulley 8 which becomes a slack portion at the time of advancing movement of a movable body.

The tension pulley 11 is forced to move in the direction shown by an arrow owing to a tension spring (not shown) and absorbs the slack of wire induced during the advancing movement. Therefore, the advancing movement of first and second movable mirrors 2 and 3 is stabilized by the provision of a tension pulley 11.

However, when a movable body makes advancing and returning movements, the tension side and the slack side of the wire 9 will be reversed during the advancing movement and returning movement. Therefore, in FIG. 1, the wire portion 9c between the guide pulley 7 and the driving pulley 8 which was a slack portion during the advancing movement will be changed into a tension portion during the time of the returning movement.

During the returning movement in which the driving pulley 8 rotates in the direction shown by an arrow b, the tension pulley 11 will be moved against the elasticity of a tension spring (not shown) as shown by a dotted line 11A owing to the fact that the wire portion 9c entrained over the tension pulley 11 has become a tension portion (or side).

The tension pulley 11 during the returning movement is desired to stop at its station as shown by a dotted line 11A, even temporarily. However, owing to the impact of the wire induced at the time of exchanging from advancing movement to returning movement, a tension spring (not shown) causes vibrating movement. Thus, during the returning movement of a movable body, the vibration phenomenon of the tension pulley between the real line position and the dotted line position will be induced. This vibration of the tension pulley will be conducted to the movable body as an extension or contraction of the wire.

The first and second movable mirrors 2 and 3 will vibrate before and behind the movable body in the direction of movement during the returning movement. In other words, a so-called boundary will be induced and the movable mirrors 2 and 3 thereby can not move at a constant speed. Therefore, the impact at the time when the movable mirrors have returned to their original positions will become large and an impact sound will be uttered and starting positions at their home positions will be undesirably changed. Further, owing to the shock, illumination lamps (not shown) which are provided substantially in a body with the first movable mirror 2 will be broken or the wire will likely be displaced from the pulleys.

Especially in a high speed reproducing apparatus, the advancing and returning speed of a movable body is usually raised. In some cases, the speed of a movable body during the returning movement is raised to 2-3 that of the speed during the advancing movement. Accordingly, the above mentioned shock of a movable body will become large and the starting positions at the time of repeated copying will not become constant.

The reasons for the induction of the boundary of a movable body are that the tension side and the slack side of a wire will be changed during the advancing and returning movements and that the tension mechanism can not absorb the slack in the wire thereby induced.

The most simple procedure for preventing the boundary of a movable body is to replace a tension spring with a strong tension spring and to make the position of a tension pulley during the returning movement unchangeable. However, by doing so, the wire will be loaded under large tension during the advancing movement of the movable body. The load to the wire, pulley or driving source will also be greatly increased. More especially, a problem in design to the effect that excess loads will be transmitted to a bearing will appear.

SUMMARY OF THE INVENTION

The present invention was conceived in order to overcome the above mentioned draw-backs seen in such a conventional apparatus:

The object of the present invention is to provide a mechanism for driving a movable body, wherein break down of illumination lamps are prevented, mechanical trouble such as dislocation of wires are prevented by stabilizing the running speed of the movable body during the advancing movement and a decrease in the induction of a boundary and further decrease of the sound of impact is obtained.

Such an object of the present invention may be achieved by providing a mechanism for driving a movable body which is characterizing in a movable body capable of reciprocating movement along guide members, a driving member for reciprocating the movable body, a wire for connecting the driving member with the movable body, a tension member arranged at the slack portion of the wire during advancing of the movable body and an elastic member for providing a strong or weak tension force to the tension member, further wherein a weak tension force is applied to the tension member during advancing of the movable body and a strong tension force is applied to the tension member during the return of the movable body.

According to the detailed characteristics of the present invention, the elastic member may substantially consist of two strong and weak springs or at least one spring and a solenoid therefor.

Further, according to the present invention, as weak tension is applied to a wire during the advancing movement of a movable body and strong tension is applied to the wire during the returning movement of the movable body, the boundary of the movable body seen in the returning movement and other various problems caused thereby can be avoided. Further, the time during which a strong tension is applied to the wire is restricted to the least necessary time, that is the returning time. Accordingly, the load applied to the driving mechanism including inclusive of a wire, pulleys and bearings will not be greatly increased and various problems caused by applying a large tension thereto will be suppressed.

BRIEF DESCRIPTION OF THE DRAWINGS

For a better understanding of the invention as well as other objects and further features thereof, reference is made to the following detailed description of the invention to be read in connection with the accompanying drawings wherein.

DETAILED DESCRIPTION OF THE PREFERRED EMBODIMENTS

Figure 1:
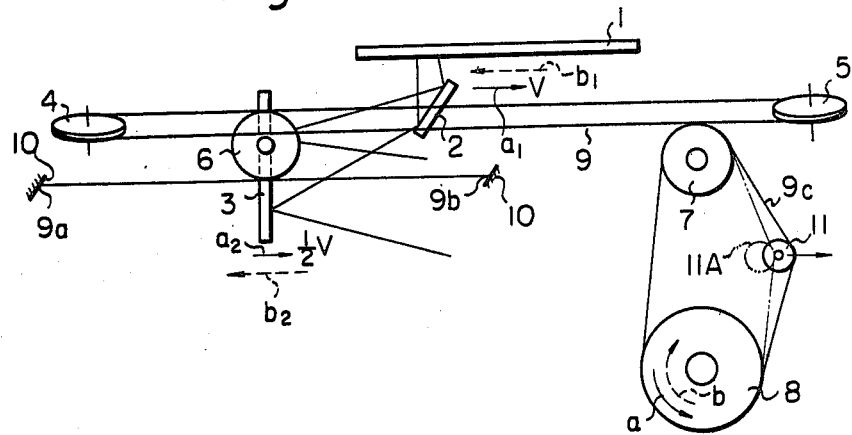
FIG. 1 is a schematic view of a conventional reproducing apparatus wherein an original is fixed and an optical system is movable.

A driving mechanism for a movable body shown in FIG. 1 is an example of the present invention exclusive of a tension member. In the following explanation, only a detailed explanation of the members omitted in the explanation of FIG. 1 and the explanation of the composition characteristic to the present invention and the effects achieved by the present invention will be set forth and detailed explanation of the same or similar members will not be given for the sake of avoiding duplication. Further, the present invention uses a wound type conduction mechanism and the following explanation will be made concerning a wire which was used an example of the conduction member. However, it is of course evident that a chain belt can be substituted for the wire in the present invention.

Figure 2:
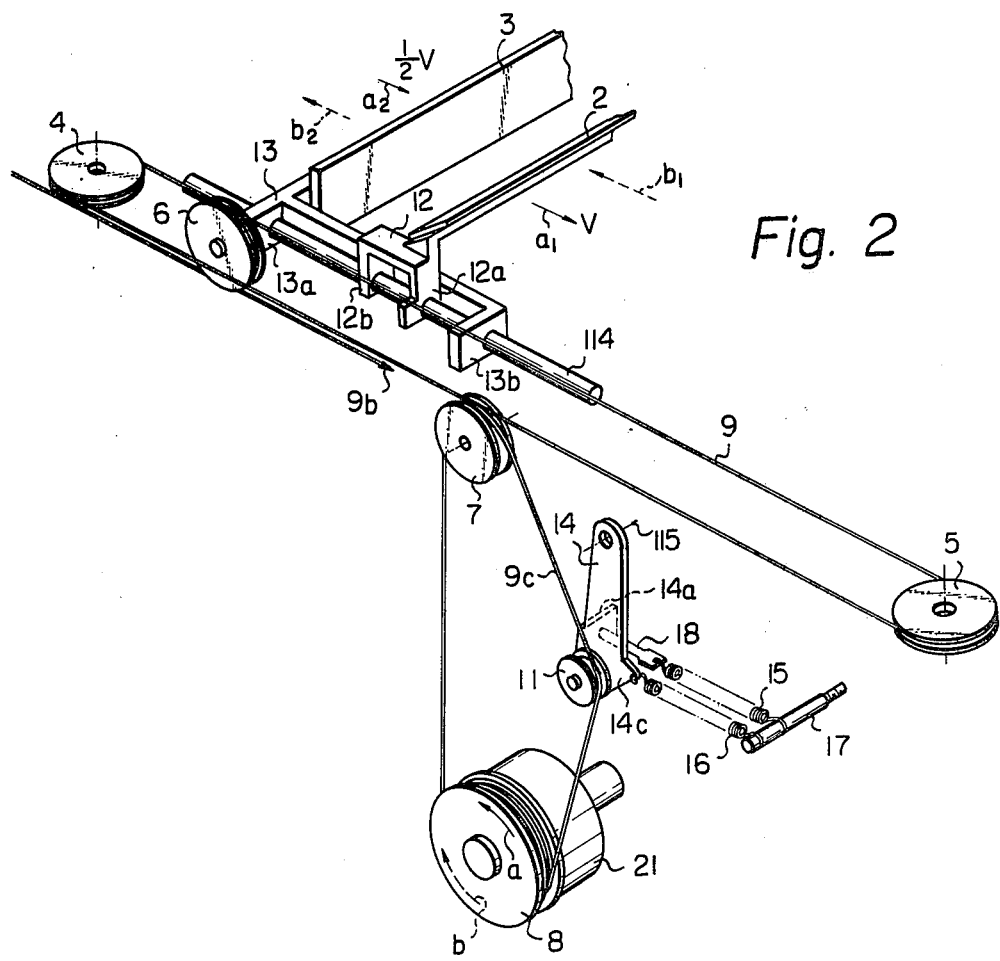
FIG. 2 is a perspective view of an embodiment of the present invention.

In FIG. 2, the first movable mirror 2 is obliquely supported on and fixed to the first support 12. The second movable mirror 3 is fixedly attached to the second support 13. The first and second supports 12 and 13 are under an original platform 1 (refer to FIG. 1) and are slidably inserted into a guide axis 114 as a guide member which is arranged parallel to the original platform and along the moving direction of the movable body.

The first support 12 is inserted with its leg portions 12a and 12b formed in the form of ] figure over guide axis 114 and the second support 13 is inserted with a leg portion 13a rotatably supporting a moving pulley 6 and a leg portion 13b which is extended toward the first support 12 and has its leg portions 12a and 12b between the leg portions 13a and 13b along guide axis 114 respectively. To one leg portion 12a of the first support 12, a portion of the wire 9 is fixed by a proper securing method.

Tension pulley 11 acting as a tension member is rotatably supported on a tension lever 14. Tension lever 14 is supported for vibration responsiveness on a supporting axis 115 fixedly planted to an immovable member (not shown).

Figure 3:
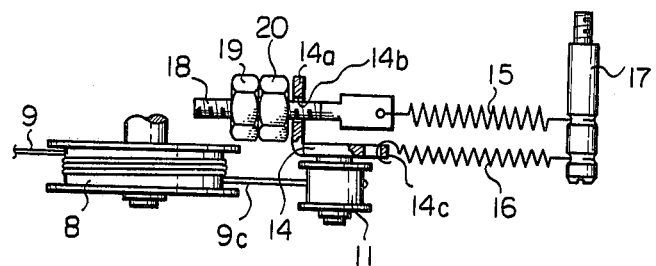
FIG. 3 is a plan view of the main parts of the present invention.

To the tension lever 14, one end of a strong and weak spring 15 and 16, respectively, are fixed and opposite ends of these springs 15 and 16 are connected to a spring anchor 17 fixedly planted to an immovable member (not shown). As seen in FIG. 3, the stronger spring 15 is connected to one end of a regulating screw 18 inserted into an aperture 14b provided at the bending portion 14a of the tension lever 14. Fixing nuts 19 and 20 are screwed onto the regulating screw 18. Further, one end of the weaker spring 16 is connected to the tension lever 14 at lower spring engaging portion 14c.

The weaker spring 16 has strength enough to absorb the slack of the wire 9 which becomes a slack portion when a movable body is undergoing advancing movement and applys a constant tension force to the wire 9c via a pulley 11.

On the contrary, the stronger spring 15 does not positively absorb the slack of a wire produced during the returning movement of the movable body and maintain the slack during the time of the advancing movement, desirably as it is, when the slack portion during the advancing movement has changed into a tension portion during the returning movement. That is, the slack in the wire 9 at the time of the advancing movement of the movable body is absorbed by the tension force of the weaker spring 16 which is applied to the tension pulley 11. The elasticity of the stronger spring 15 is determined so as to maintain the position of the tension pulley 11 at this time during the returning movement.

In other words, when the first and second movable mirrors 2 and 3 are advancing, the tension force of the weaker spring 16 is applied to wire 9 and when the first and second movable mirrors are returning, the tension force of the stronger spring 15 is applied to the wire 9.

Further, the driving pulley 8 is connected with a driving motor (not shown) through a clutch 21 and its rotation is controlled by a limit switch or a print button arranged at the both ends of the moving region of the first and second movable mirrors.

Thus, if the clutch 21 is actuated and the driving pulley 8 is rotated in the direction shown by an arrow a, then wire 9 moves and causes the first support 12 to move at the speed V and the second support 13 to move at the speed ½V through a moving pulley 6 in the direction of advancing movement shown by arrows a1, a2 respectively. At this time, wire 9 is caused to move at a constant speed while absorbing the slack in the slack portion 9c by the elasticity of the spring 16 which is giving weaker tension force to the tension pulley 11.

When the first and second movable mirrors 2 and 3 have finished their going movement, the driving pulley 8 begins to rotate in the direction shown by an arrow b. The slack portion and the tension portion of the wire 9 are thereby interchanged with each other and the portion 9c of the wire which was formerly the slack portion during the advancing movement becomes the tension portion during the returning movement.

Though this tension portion 9c tends to shrink in company with the returning rotation (In FIG. 1, the phenomenon in which the tension pulley 11 tends to move from the full line position to the dotted line position), at this time, as the tension pulley 11 is applied the elasticity of the spring 15 provides a strong tension force, the wire in the tension portion 9c is scarcely shrunk and maintains the position of the slack portion during the advancing movement.

The portion 9c of the wire during advancing movement and returning movement are inevitably different from each other, since the load charged upon the wire portion 9c at the time of advancing movement is different from that during returning movement. Thus, it is inevitable that some extension or contraction will be induced in the slack portion during the advancing movement and the tension portion during returning movement. Some extension or contraction of this wire, in other words, some movement of the tension pulley 11 is preferably allowed in the the boundary limits of the first and second mirrors insofar as such movable bodies may be suppressed. That is, if the extension or contraction of the wire 9 is not allowed in each of the advancing and returning movements, such means that a strong tension force will be constantly applied to the wire. This will cause the effect of an overload on the pulleys, bearings or the like.

As mentioned above, according to the apparatus of the present invention wherein a weaker tension force is applied to a movable body during advancing movement and a stronger tension force is applied to a movable body during returning movement, the extension or contraction of the wire during the returning movement may be suppressed. Accordingly the boundary of the movable body and other various defects induced following the boundary will also be prevented. Further, the time during which a strong tension force is applied is limited to the least necessary time. Therefore, the load to the wire or the pulley will not be extraordinarily increased.

Next, as elastic members for applying a strong or a weak tension force to the tension pulley 11, in FIG. 3 are shown two strong and weak springs 15 and 16. However, in FIGS. 4 to 6, there are shown different examples of such elastic members.

Figure 4:
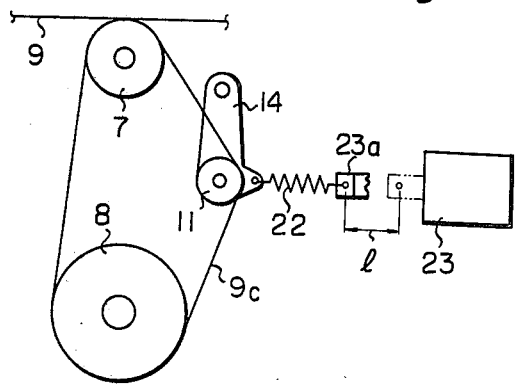
FIG. 4 and FIG. 5 are front views of different examples of elastic members providing a strong or a weak tension force to a tension member respectively.

In FIG. 4, one end of a spring 22 is fixed to the tension lever 14 and an opposite end of the spring 22 is fixed to the movable part 23a of the fixedly arranged solenoid 23. During advancing of the movable body, the electric current to the solenoid 23 is discontinued. For this reason, the tension charged to the slack portion 9c of the wire during this time is lightly charged by the elasticity of the spring 22 at the time of contraction. During the returning of the movable body, solenoid 23 is energized to pull the spring 22 as far as the length 1 and thus strengthens spring 22. Further, as the tension part 9c of the wire during the returning movement is subjected to a strong tension force by the extended spring 22, the contraction of the wire, in other words, the movement of the tension pulley 11 is suppressed and a boundary of movement of the movable body is also prevented.

Figure 5:
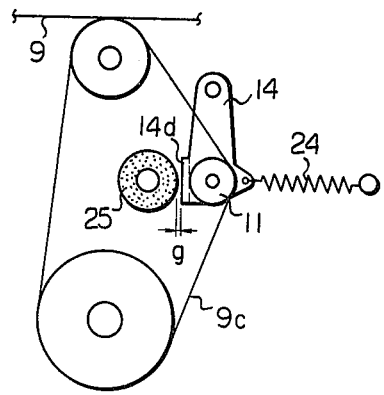

In FIG. 5, a weak spring 24 is hung from tension lever 14 for absorbing the slack of the wire during advancing movement of the movable body. At the back of the tension lever 14 is arranged an elastic stopper 25 with a small gap g to a contact portion 14d of the lever 14. The slack in the wire during advancing movement of the movable body is absorbed by the tension force of the spring 24. During returning, the wire portion 9c becomes a tension portion and tends to move the tension pulley 11 in the leftward direction as seen in FIG. 5. However, as the contact portion 14d of the tension lever 14 collides against the elastic stopper 25, the contact portion moves only a small distance corresponding to the gap g and the wire 9 does not heavily contract. Therefore, to the tension pulley 11, a strong or weak tension force is applied to the tension pulley during advancing or returning of the movable body.

Further, if the elastic stopper 25 is formed as a rotary member, this member may directly collide with the tension pulley 11. Further, taking into consideration the elastic deformation of the elastic body stopper 25 during returning movement in advance, the elastic body may be constant collide with the contact portion 14d or the tension pulley 11. In this case, the provision for gap g becomes needless. Further, as an elastic body stopper 25, a contraction spring having an elasticity enough to meet the contraction of the wire portion 9c at the time of returning movement may be utilized and arranged at the back of the tension lever 14.

Figure 6:
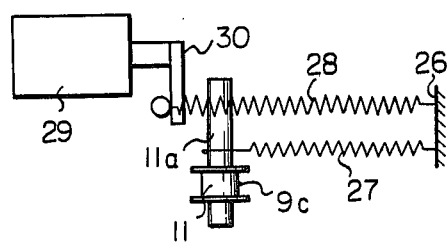
FIG. 6 is a plan view for explaining the operation of another embodiment of the present invention.
Figure 6:
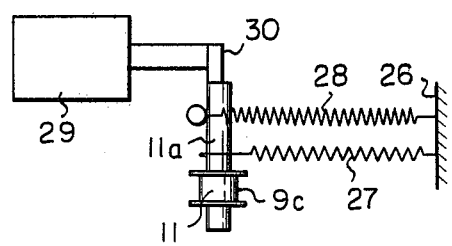

In FIG. 6, one end of a weak spring 27 is directly fixed to the axis 11a of the tension pulley and an opposite end of the spring 27 is fixed to an immovable body 26. One end of the spring 28 which is stronger than the spring 27 is fixed to immovable body 26, and the opposite end is fixed to a stopper 30 provided in the movable portion of the solenoid 29. Weak spring 27 has enough of a tension force to absorb the slack of the wire during advancing of the movable body and the strong spring 28 has a force enough to only suppress contraction of the wire during the return of the movable body. During advancing of the movable body, as seen in FIG. 6a, solenoid 29 is energized and strong spring 28 is extended and tension force is applied to the tension pulley 11 by the weak spring 27. During the return, an electric current to the solenoid 29 is discontinued and as seen in FIG. 6b, a strong tension force is applied to the contracted tension pulley 11 by the strong spring 28.

As mentioned above, the elastic member applying a strong or a weak tension force to the tension member shown in FIGS. 4 to 6 is made so as to apply a weak tension force during advancing of the movable body and to apply a strong tension force during the return of the movable body. Further, it follows that other mechanical means, for example, the application of a pulling action to a spring through cam members may be used in place of solenoids 23 and 29.

In the explanation of above embodiments, as a movable body, the first and second movable mirrors of an optical system and a support therefor were noted, but of course, the present invention is never confined to these particulars and an original platform making reciprocation movement may also be included a the movable body of the present invention.

Figure 7:
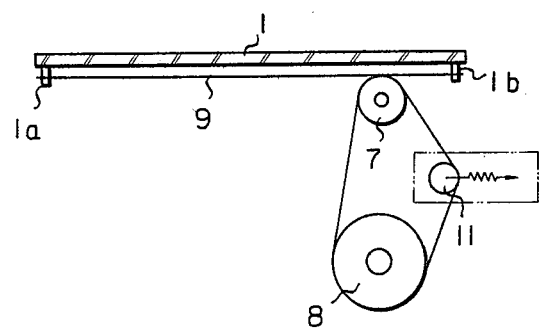
FIG. 7 is a schematic front view of an embodiment of the present invention wherein the movable body is an original platform.

In FIG. 7, both ends of wire 9 are fixed to stopping pins 1a and 1b which are planted to the lower surface of the original platform 1 (only shown diagramatically). Wire 9 is entrained over the guide pulley 7, driving pulley 8 and tension pulley 11. Also 11, a strong or a weak tension force is applied to the tension pulley in accordance with advancing or returning movement of the original platform. The same is the case with the movable mirrors such that a boundary will be induced during returning movement of the original platform. Further detailed explanation will be omitted to avoid duplication.

As mentioned above, one of the main characteristics of the present invention consists of providing a strong or a weak tension force to the tension member. Other main characteristics consists of the arranged position of the tension member. That is, as well shown in FIG. 2 the tension pulley 11 as a tension member in the present invention is operatively connected to the loop portion of the wire entrained over the guide pulley 7 and the driving pulley 8. This has the advantage in that the impact given to the wire during the exchange of moving directions at both ends of the moving region of a movable body is not directly conducted to the movable body. In other words, at he stroke end of a movable body, the wire is exchanged in its moving direction. Thus, the wire has no relation to the existence of a tension member. Some slack and some tension following the slack are generated and only small shock will be given to the movable body. If the tension member is provided at a position wherein tension is directly applied to the wire portion between fixed pulleys 4 and 5, then the shock will be directly conducted to the movable body. However, in the present invention wherein tension is applied to a loop which is different from the loop between the fixed pulleys, the above mentioned shock will be greatly alleviated.

While the present invention has been described with reference to the structure disclosed herein, it is not confined to the details set forth and this application is intended to cover such modifications or changes as may come within true spirit of the scope of the following claims.

What is claimed is:

1. Means for driving a movable body comprising:
a guide member;
a movable body reciprocatingly mounted along said guide member;
a member for driving said movable body so as to advance and return said movable body;
a wire connecting said movable body with said driving member;
a tension member arranged in a slack portion of the wire at the time of advancing movement of the movable body; and
first and second separate and parallel elastic means for applying a strong or a weak tension force, respectively, to said tension member, said weak tension force being applied to said tension member during advancing movement to said movable body and said strong tension force being applied to said tension member during returning movement of said movable body.

2. Means for driving a movable body as described in claim 1 wherein said elastic means comprises a strong spring and a weak spring.

3. Means for driving a movable body comprising:
a guide member;
a movable body reciprocatingly mounted along said guide member;
a member for driving said movable body so as to advance and return said movable body;
a wire connecting said movable body with said driving member;
a tension member arranged in a slack portion of the wire at the time of advancing movement of the movable body; and
elastic means for applying a strong or a weak tension force to said tension member, said weak tension force being applied to said tension member during advancing movement to said movable body and said strong tension force being applied to said tension member during returning movement of said movable body wherein said elastic means comprises a spring constantly applying a weak tension force to the tension member and a solenoid for strengthening the elasticity of said spring during the returning movement of said movable body.

4. Means for driving a movable body comprising:

a guide member;

a movable body reciprocatingly mounted along said guide member;

a member for driving said movable body so as to advance and return said movable body;

a wire connecting said movable body with said driving member;

a tension member arranged in a slack portion of the wire at the time of advancing movement of the movable body; and elastic means for applying a strong or a weak tension force to said tension member, said weak tension force being applied to said tension member during advancing movement of said movable body and said strong tension force being applied to said tension member during returning movement of said movable body wherein said elastic means comprises a weak spring constantly applying a weak tension force to the tension member, a strong spring applying a strong tension force to the tension member during returning movement of said movable body and a solenoid maintaining the strong spring in a position so as to provide elasticity to the tension member during advancing movement of said movable body and releasing its maintaining action to said strong spring for providing a strong tension force to the tension member during returning movement of said movable member.

5. Means for driving a movable body comprising:

a guide member;

a movable body reciprocatingly mounted along said guide member;

a member for driving said movable body so as to advance and return said movable body;

a wire connecting said movable body with said driving member;

a tension member arranged in a slack portion of the wire at the time of advancing movement of the movable body; and elastic means for applying a strong or a weak tension force to said tension member, said weak tension force being applied to said tension member during advancing movement to said movable body and said strong tension force being applied to said tension member during returning movement of said movable body wherein said elastic means comprises a spring providing a constantly weak tension force to said tension member during advancing movement of said movable body and a rotary elastic stopper contacting said tension member controlling the movement of said movable body during returning movement of said movable body.

6. Means for driving a movable body comprising:

a guide member;

a movable body reciprocatingly mounted along said guide member;

a member for driving said movable body so as to advance and return said movable body;

a wire connecting said movable body with said driving member;

a tension member arranged in a slack portion of the wire at the time of advancing movement of the movable body; and first and second separate and parallel elastic means for applying a strong or a weak tension force to said tension member, respectively, said weak tension force being applied to said tension member during advancing movement of said movable body and said strong tension force being applied to said tension force being applied to said tension member during returning movement of said movable body and further comprising:

a driving source;

a moving pulley provided in the movable body over which the wire is entrained;

a pair of fixed pulleys arranged on opposite sides of the region of movement of said movable body;

a drive pulley connected with said driving source; and a guide pulley guiding the wire stretched between said pair of fixed pulleys to said driving pulley and wherein both ends of said wire mounted on said moving pulley in the form of a U-shaped figure are fixed respectively.

7. Means for driving a movable body as described in claim 6, wherein said tension member is positioned between said guide pulley and driving pulley.

* * * * *